United States Patent
Verma

(10) Patent No.: US 11,175,849 B2
(45) Date of Patent: *Nov. 16, 2021

(54) SYSTEMS AND METHODS FOR DEFINING REPLICATION OF DATA

(71) Applicant: Bank of America Corporation, Charlotte, NC (US)

(72) Inventor: Sandeep Verma, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,970

(22) Filed: Aug. 18, 2020

(65) Prior Publication Data

US 2020/0379650 A1 Dec. 3, 2020

Related U.S. Application Data

(63) Continuation of application No. 16/200,432, filed on Nov. 26, 2018, now Pat. No. 10,776,038.

(51) Int. Cl.
*G06F 3/06* (2006.01)
*G06F 16/953* (2019.01)

(52) U.S. Cl.
CPC .............. *G06F 3/065* (2013.01); *G06F 3/064* (2013.01); *G06F 3/0619* (2013.01); *G06F 3/0673* (2013.01); *G06F 16/953* (2019.01)

(58) Field of Classification Search
CPC ...... G06F 3/065; G06F 16/953; G06F 3/0619; G06F 3/064; G06F 3/0673
See application file for complete search history.

(56) References Cited

U.S. PATENT DOCUMENTS

| | | | |
|---|---|---|---|
| 7,519,637 B2 | 4/2009 | Shuma et al. | |
| 7,788,225 B2 | 8/2010 | Fish et al. | |
| 8,271,455 B2 | 9/2012 | Kesselman | |
| 8,285,686 B2 | 10/2012 | Kesselman | |
| 8,838,595 B2 | 9/2014 | Kesselman | |
| 8,862,617 B2 | 10/2014 | Kesselman | |
| 9,378,106 B1 | 6/2016 | Ben-Moshe et al. | |
| 9,384,232 B2 | 7/2016 | Pittelko | |
| 9,436,558 B1 | 9/2016 | Per et al. | |
| 2005/0223156 A1 | 10/2005 | Lubbers et al. | |
| 2016/0092124 A1* | 3/2016 | Cowling | G06F 3/0655 711/103 |

(Continued)

*Primary Examiner* — Charles Rones
*Assistant Examiner* — Hewy H Li
(74) *Attorney, Agent, or Firm* — Michael A. Springs

(57) ABSTRACT

In one embodiment, a system includes one or more processors and a memory storing instructions that, when executed by the one or more processors, cause the one or more processors to perform operations including sequencing a plurality of rows into a first sequence based on a first criteria and determining to store a first set of the plurality of rows in a first block of a first storage unit in accordance with the first sequence. The operations further include determining to store, in a first block of the second storage unit, a block identification of the first block of the first storage unit and a row identification for each row of the first set of the plurality of rows. The operations further include re-creating the first set of the plurality of rows of the first block of the first storage unit using information stored in the second storage unit.

20 Claims, 7 Drawing Sheets

(56) References Cited

U.S. PATENT DOCUMENTS

2016/0147470 A1* 5/2016 Stefanowicz ......... G06F 3/0619
 711/111
2020/0167079 A1 5/2020 Verma
2020/0371884 A1* 11/2020 Ouyang ............. G06F 11/2074

* cited by examiner

DATA STORAGE UNIT 210    BLOCK B1      ← TABLE 280

| Customer ID | Customer Name | Customer City | Account | Transaction Amount |
|---|---|---|---|---|
| 1 | B | City 1 | Checking 1 | $10 |
| 2 | D | City 2 | Savings 2 | $20 |
| 3 | A | City 2 | Credit 3 | $15 |
| ⋮ | ⋮ | ⋮ | ⋮ | ⋮ |
| 100 | C | City 3 | Credit 5 | $25 |

DATA STORAGE UNIT 220    BLOCK B3      ← TABLE 282

| Customer ID | Customer Name | Customer City | Account | Transaction Amount |
|---|---|---|---|---|
| 1 | B | City 1 | Checking 1 | $10 |
| 2 | D | City 2 | Savings 2 | $20 |
| 3 | A | City 2 | Credit 3 | $15 |
| ⋮ | ⋮ | ⋮ | ⋮ | ⋮ |
| 100 | C | City 3 | Credit 5 | $25 |

DATA STORAGE UNIT 230    BLOCK B2      ← TABLE 284

| Customer ID | Customer Name | Customer City | Account | Transaction Amount |
|---|---|---|---|---|
| 1 | B | City 1 | Checking 1 | $10 |
| 2 | D | City 2 | Savings 2 | $20 |
| 3 | A | City 2 | Credit 3 | $15 |
| ⋮ | ⋮ | ⋮ | ⋮ | ⋮ |
| 100 | C | City 3 | Credit 5 | $25 |

*FIG. 2B*
*(Prior Art)*

DATA STORAGE UNIT 162 BLOCK B1        ← TABLE 312

| Row ID | Customer ID | Customer Name | Customer City | Account | Transaction Amount |
|---|---|---|---|---|---|
| 1 | 1 | B | City 1 | Checking 1 | $10 |
| 2 | 2 | D | City 2 | Savings 2 | $20 |
| 3 | 3 | A | City 2 | Credit 3 | $15 |
| ⋮ | ⋮ | ⋮ | ⋮ | ⋮ | ⋮ |
| 100 | 100 | C | City 3 | Credit 5 | $25 |

DATA STORAGE UNIT 164 BLOCK B1        ← TABLE 314

| Row ID | Customer Name | Customer ID | Customer City | Account | Transaction Amount |
|---|---|---|---|---|---|
| 3 | A | 3 | City 2 | Credit 3 | $15 |
| 1 | B | 1 | City 1 | Checking 1 | $10 |
| 100 | C | 100 | City 3 | Credit 5 | $25 |
| ⋮ | ⋮ | ⋮ | ⋮ | ⋮ | ⋮ |
| 4 | E | 4 | City 1 | Checking 4 | $5 |

DATA STORAGE UNIT 166 BLOCK B1        ← TABLE 316

| Row ID | Customer City | Customer ID | Customer Name | Account | Transaction Amount |
|---|---|---|---|---|---|
| 1 | City 1 | 1 | B | Checking 1 | $10 |
| 4 | City 1 | 4 | E | Checking 4 | $5 |
| 2 | City 2 | 2 | D | Savings 2 | $20 |
| ⋮ | ⋮ | ⋮ | ⋮ | ⋮ | ⋮ |
| 100 | City 3 | 100 | C | Credit 5 | $25 |

*FIG. 3B*

SYSTEMS AND METHODS FOR DEFINING REPLICATION OF DATA

CROSS-REFERENCE TO RELATED APPLICATIONS

This application is a continuation of U.S. patent application Ser. No. 16/200,432 filed Nov. 26, 2018, by Sandeep Verma, and entitled "SYSTEMS AND METHODS FOR DEFINING REPLICATION OF DATA," which is incorporated herein by reference.

TECHNICAL FIELD

This disclosure generally relates to computer memory. More specifically, certain embodiments relate to efficient utilization of computer memory and/or efficient recovery in the event of a computer memory error.

BACKGROUND

Computer systems, such as database management systems, store data in memory. Errors can occur in the memory such that retrieving the data may be difficult or impossible. To address, this problem, data may be replicated in multiple memory locations. However, existing techniques for replicating data may be inefficient.

SUMMARY

According to an embodiment, a system includes one or more processors and a memory storing instructions that, when executed by the one or more processors, cause the one or more processors to perform operations including determining, by a row identification engine, a row identification for each of a plurality of rows of data. The operations also include sequencing, by a sequence engine, the plurality of rows into a first sequence based on a first criteria and a second sequence based on a second criteria. The operations also include determining, by the sequence engine, to store: a first set of the plurality of rows in a first block of a first storage unit in accordance with the first sequence; a second set of the plurality of rows in a first block of a second storage unit in accordance with the second sequence; a block identification of the first block of the first storage unit and the row identification for each row of the first set of the plurality of rows in the first block of the second storage unit; and a block identification of the first block of the second storage unit and the row identification for each row of the second set of the plurality of rows in the first block of the first storage unit. The operations further include receiving, by the search engine, a search criteria input for data stored in the first data storage unit and the second data storage unit. The search criteria input is associated with the first criteria. The operations further include determining, by the search engine, to search the first data storage unit based on the search criteria input and determining, by the search engine, that data stored in the first block of the first data storage unit is inaccessible. The operations further include re-creating, by a re-creation engine, the first set of the plurality of rows of the first block of the first storage unit using information stored in the second storage unit; and communicating, by the search engine, a response to the search criteria input.

According to another embodiment, a method includes determining, by a row identification engine, a row identification for each of a plurality of rows of data. The method also includes sequencing, by a sequence engine, the plurality of rows into a first sequence based on a first criteria and a second sequence based on a second criteria. The method also includes determining, by the sequence engine, to store: a first set of the plurality of rows in a first block of a first storage unit in accordance with the first sequence; a second set of the plurality of rows in a first block of a second storage unit in accordance with the second sequence; a block identification of the first block of the first storage unit and the row identification for each row of the first set of the plurality of rows in the first block of the second storage unit; and a block identification of the first block of the second storage unit and the row identification for each row of the second set of the plurality of rows in the first block of the first storage unit. The method further includes receiving, by the search engine, a search criteria input for data stored in the first data storage unit and the second data storage unit. The search criteria input is associated with the first criteria. The method further includes determining, by the search engine, to search the first data storage unit based on the search criteria input and determining, by the search engine, that data stored in the first block of the first data storage unit is inaccessible. The method further includes re-creating, by a re-creation engine, the first set of the plurality of rows of the first block of the first storage unit using information stored in the second storage unit; and communicating, by the search engine, a response to the search criteria input.

According to yet another embodiment, one or more computer-readable storage media embody instructions that, when executed by a processor, cause the processor to perform operations including determining, by a row identification engine, a row identification for each of a plurality of rows of data. The operations also include sequencing, by a sequence engine, the plurality of rows into a first sequence based on a first criteria and a second sequence based on a second criteria. The operations also include determining, by the sequence engine, to store: a first set of the plurality of rows in a first block of a first storage unit in accordance with the first sequence; a second set of the plurality of rows in a first block of a second storage unit in accordance with the second sequence; a block identification of the first block of the first storage unit and the row identification for each row of the first set of the plurality of rows in the first block of the second storage unit; and a block identification of the first block of the second storage unit and the row identification for each row of the second set of the plurality of rows in the first block of the first storage unit. The operations further include receiving, by the search engine, a search criteria input for data stored in the first data storage unit and the second data storage unit. The search criteria input is associated with the first criteria. The operations further include determining, by the search engine, to search the first data storage unit based on the search criteria input and determining, by the search engine, that data stored in the first block of the first data storage unit is inaccessible. The operations further include re-creating, by a re-creation engine, the first set of the plurality of rows of the first block of the first storage unit using information stored in the second storage unit; and communicating, by the search engine, a response to the search criteria input.

Technical advantages of this disclosure may include one or more of the following. Certain embodiments may allow for efficient utilization of computer memory. Systems and methods are provided for replicating data to create multiple replicated copies of single table that are stored in different data storage units. Each replicated table is arranged in a different order based on different sorting schemes, which allows data searches to be performed in accordance with a particular scheme without the need to load the data into memory and rehash the data. Different hash, sorting, and/or indexing functions may be executed separately on paired blocks located in different storage units to leverage different schemes. Different scans may leverage relevant schemes, eliminating the need to reshuffle and reorder the data. Avoiding the rehash of data saves time and computer resources. Additionally, certain embodiments may provide systems and methods for efficiently re-creating data in the event of an error in computer memory.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which:

FIG. 2B illustrates example block data that may be generated by the data warehouse of FIG. 2A;

FIG. 3B illustrates example block data that may be generated by the data warehouse of FIG. 3A;

DETAILED DESCRIPTION

Big data generally runs on low cost commodity hardware machines. The data is often duplicated on several different storage units (e.g., a node or a machine) to ensure data integrity and consistency. Data replication is typically done block-by-block basis. Every new block of a data storage unit is replicated on a different data storage unit such that the replicated blocks are exact replicas of each other. If one block of a data storage unit is inaccessible, then its copy from replication is accessed from another block of a different data storage unit. Traditionally, all copies run on the same hash function using the same column. For all other columns that are not part of the hash, the data may need to be loaded into memory and rehashed before access and join.

The replication systems and methods of this disclosure replicate data across different data storage units based on a batch/load basis rather than on block-to-block basis as in traditional big data. The data is replicated in different orders of rows derived through different hashing and/or ordering functions. Every row of the batch of data is assigned a row identification number. Every block that stores the data contains two sections. The first block section stores block identifiers and row identifiers of pairing blocks and the second block section stores rows of data generated using a hash, sorting, and/or index function. The data for each paring block is generated using a different hash, sorting, and/or index function. If a pairing block of a first data storage unit is inaccessible, a pairing block of a second data storage unit may be used to retrieve the row identifications for the inaccessible paring block. The row identifications are then used to search within the second data storage unit and re-create the inaccessible block.

Figure 1:
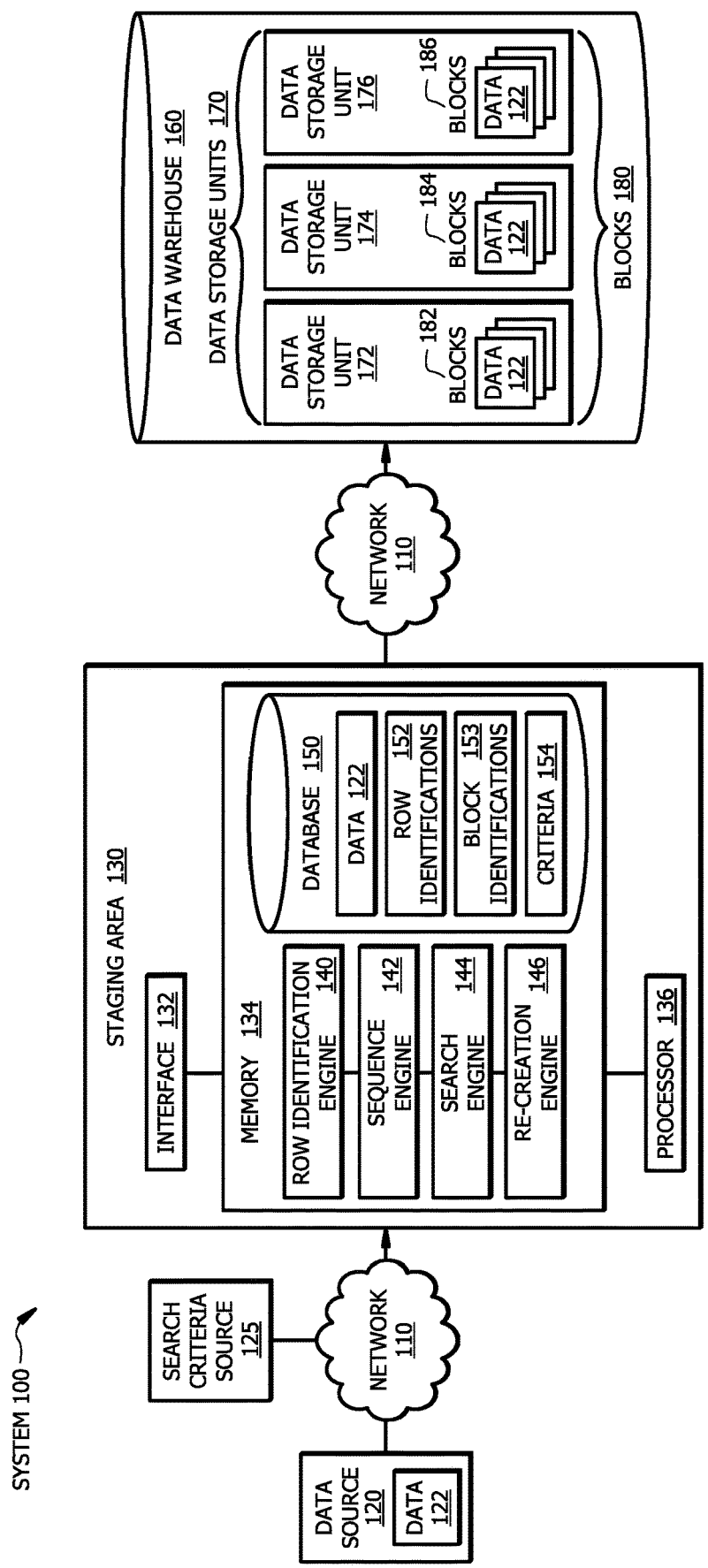
FIG. 1 illustrates an example system for defining replication of data.
Figure 2A:
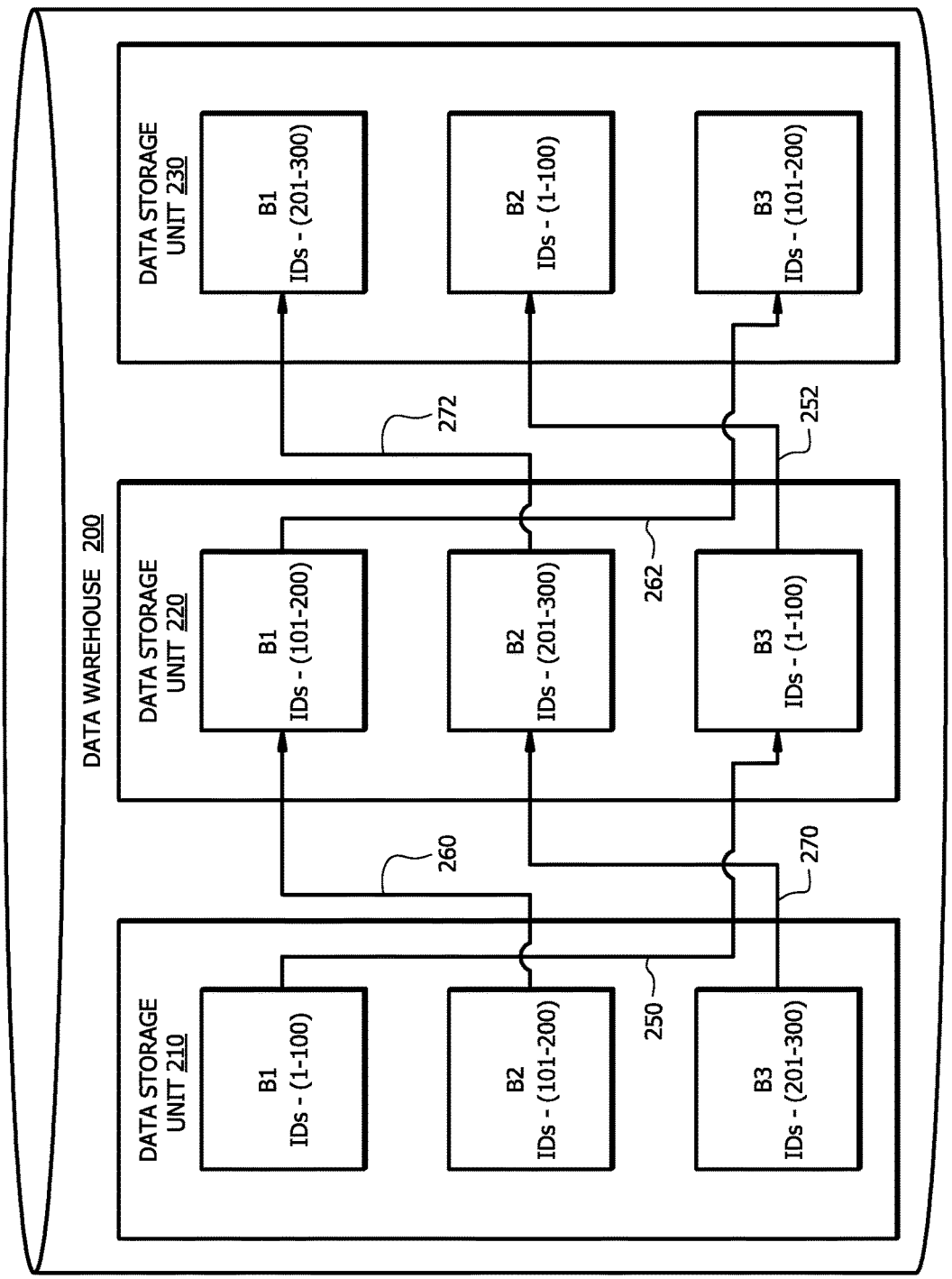
FIG. 2A illustrates an example data warehouse that may be used by a prior art system.
Figure 3A:
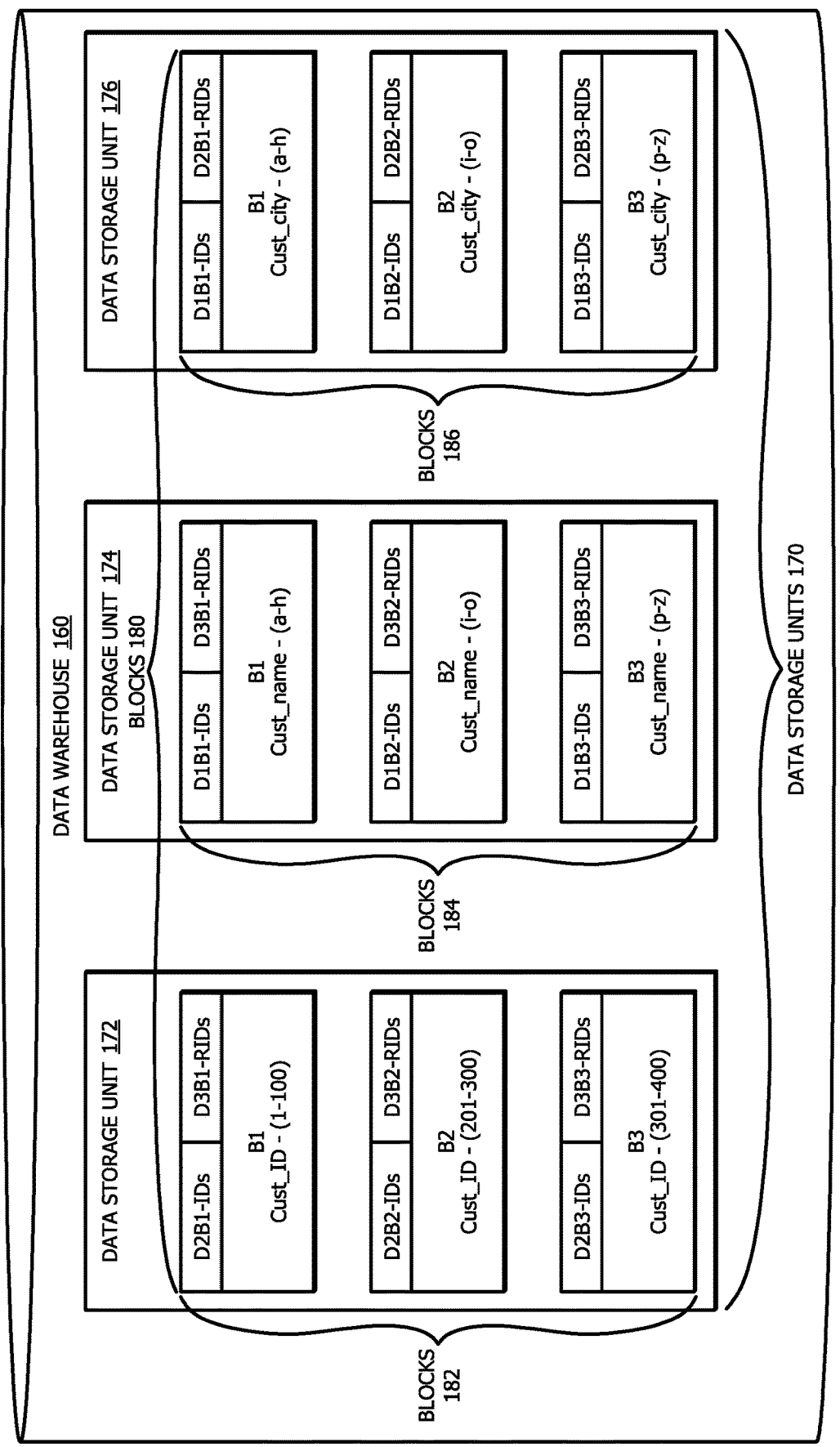
FIG. 3A illustrates an example data warehouse that may be used by the system of FIG. 1.
Figure 4:
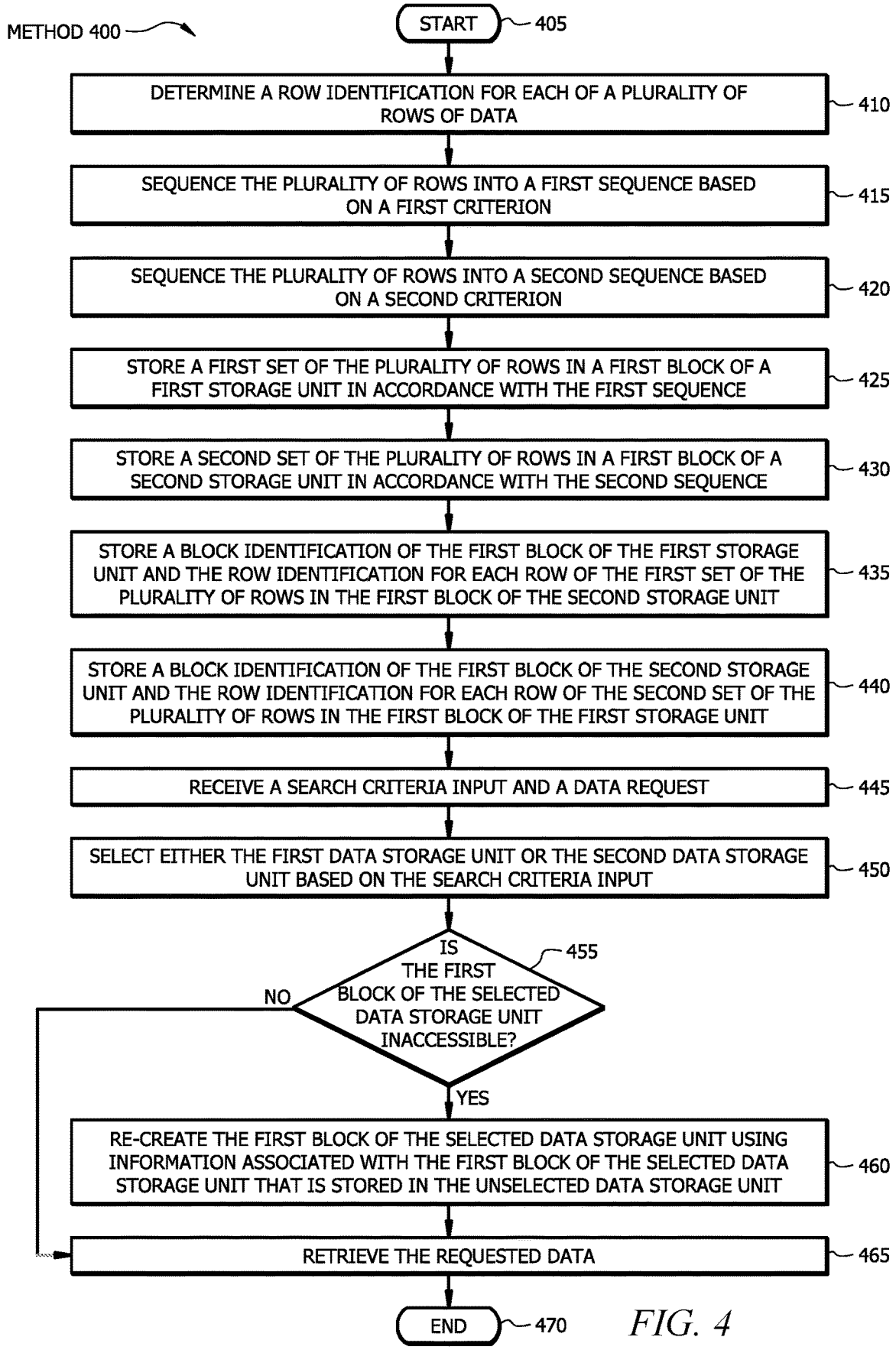
FIG. 4 illustrates an example method for defining replication of data.
Figure 5:
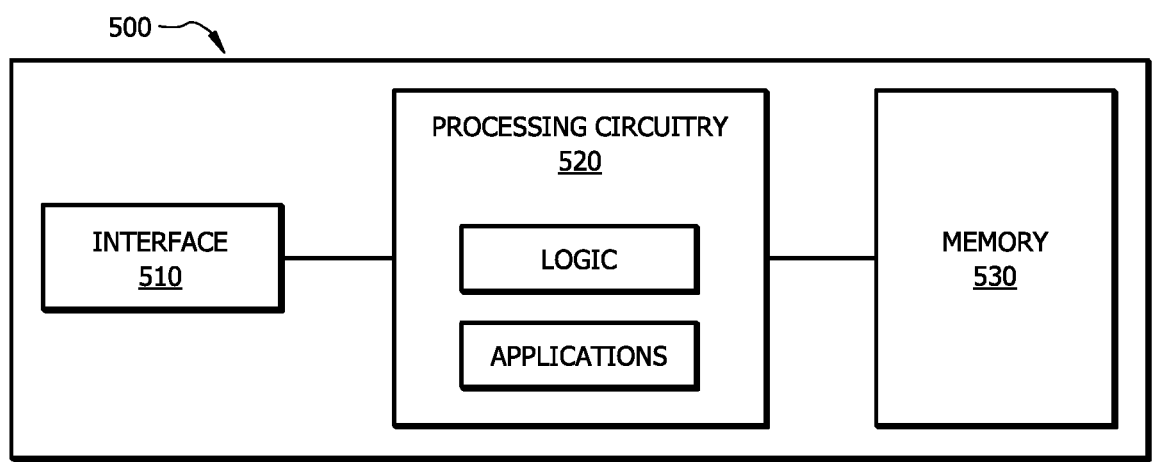
FIG. 5 illustrates an example computer system that may be used by the systems and methods described herein.

FIGS. 1 through 5 show example systems and methods for defining replication of data. FIG. 1 illustrates an example system for defining replication of data. FIG. 2A shows an example data warehouse that may be used by a prior art system and FIG. 2B shows example block data that may be generated by the data warehouse of FIG. 2A. FIG. 3A shows an example data warehouse that may be used by the system of FIG. 1 and FIG. 3B shows example block data that may be generated by the data warehouse of FIG. 3A. FIG. 4 shows an example method for defining replication of data. FIG. 5 shows an example computer system that may be used by the systems and methods described herein.

FIG. 1 illustrates an example system 100 for defining replication of data. System 100 of FIG. 1 includes a network 110, a data source 120, data 122, a staging area 130, and a data warehouse 160. Staging area 130 includes an interface 132, a memory 134, and a processor 136. Memory 134 includes a row identification engine 140, a sequence engine 142, a search engine 144, a re-creation engine 146, and a database 150. Database 150 of staging area 130 stores data 122, row identifications 152, block identifications 153, and criteria 154. Data warehouse 160 of system 100 includes data storage units 170 and blocks 180. A data storage unit 172 of data storage units 170 includes blocks 182, a data storage unit 174 of data storage units 170 includes blocks 184, and a data storage unit 176 of data storage units 170 includes blocks 186. System 100 or portions thereof may be associated with an entity, which may include any entity, such as a business or company that defines replication of data. The elements of system 100 may be implemented using any suitable combination of hardware, firmware, and software. For example, the elements of system 100 may be implemented using one or more components of the example computer system of FIG. 5.

Network 110 of system 100 may be any type of network that facilitates communication between components of system 100. Network 110 may connect data 120, staging area 130, and data warehouse 160 of system 100. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a combination of two or more of these, or other suitable types of networks. Network 110 may include one or more networks. Network 110 may be any communications network, such as a private network, a public network, a connection through Internet, a mobile network, a WI-FI network, a Bluetooth network, etc. One or more components of system 100 may communicate over network 110. For example, staging area 130 may communicate over network 110, including receiving data 122 from one or more data sources 120 and transmitting data 122 to data warehouse 160.

Data 122 represents any information that can be stored in data warehouse 160. Data 122 may be any type of data (e.g., raw data, cleansed data, or batched data). Data 122 may include data received by an entity (e.g., a financial institution, a retailer, a telecommunication company, and the like). Data 122 may include financial data, customer data, social media data, or any other data suitable for processing. Data 122 may include information associated with one or more persons. For example, data 122 may include customer identifications, customer names, and customer cities. Data 122 may be retrieved from one or more data sources 120. Data sources 120 may include one or more operational systems or files (e.g., a flat file). Data sources 120 may include a network (e.g., the Internet), a customer contact center, social media, mobile devices, and the like.

Search criteria source 125 is any source suitable for receiving and/or generating search criteria input. For example, search criteria source 125 may be a user device (e.g., a smartphone, tablet, laptop, or desktop computer) external to staging area 130 that receives the search criteria input from a user (e.g., an administrator). As another example, search criteria source 125 may perform one or more automated processes to generate the search criteria input. Search criterial source 125 may communicate with staging area 130 via network 110. Search criteria source 125 may include one or more components of the example computer system of FIG. 5. In certain embodiments, search criteria source 125 may be located within staging area 130.

Staging area 130 is an intermediate storage area used to process data 122. Staging area 130 receives data 122 from one or more data sources 120. Staging area 130 may consolidate data 122 from multiple sources 120. Staging area 130 may receive data 122 in accordance with a schedule (e.g., a daily basis, a weekly basis, and the like). Staging area 130 includes interface 132, memory 134, and processor 136.

Interface 132 of staging area 130 represents any suitable computer element that can receive information from network 110, transmit information through network 110, perform suitable processing of the information, communicate to other components (e.g., data sources 120 and data warehouse 160) of system 100, or any combination of the preceding. Interface 132 may receive data 122 from one or more data sources 120 via network 110, for example. Interface 132 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 134 of staging area 130 stores, permanently and/or temporarily, received and transmitted information, as well as system software, control software, other software for staging area 130, and a variety of other information. Memory 134 may store information for execution by processor 136. Memory 134 includes any one or a combination of volatile or non-volatile local or remote devices suitable for storing information. Memory 134 may include Random Access Memory (RAM), Read-only Memory (ROM), magnetic storage devices, optical storage devices, or any other suitable information storage device or a combination of these devices. Memory 134 may include any suitable information for use in the operation of staging area 130. Additionally, memory 134 may be a component external to (or may be partially external to) staging area 130. Memory 134 may be located at any location suitable for memory 134 to communicate with staging area 130. Memory 134 of staging area 130 stores row identification engine 140, sequence engine 142, search engine 144, and re-creation engine 146.

Row identification engine 140 of staging area 130 is an application that generates row identifications 152 for data 122. Row identification engine 140 may generate a row identification 152 for each row of data 122 (e.g., a batch of data 122). Each row identification 152 may be a virtual row identification. Each row identification 152 may comprise alphabetic characters, numeric characters, alphanumeric characters, and the like.

Row identification engine 140 may determine a number of blocks 180 required to store data 122 in data warehouse 60. For example, row identification engine 140 may determine that three blocks are required to store data 122 in data storage unit 172 of data warehouse 160. The number of blocks 180 required to store data 122 is determined based on the size of data 122 and the size of each block 180. Row identification engine 140 may generate one or more block identifications 153 for blocks 180 of data storage warehouse 160. Each block identification 153 may comprise alphabetic characters, numeric characters, alphanumeric characters, and the like.

Sequence engine 142 of staging area 130 is an application that sequences data 122 into one or more sequences. Sequence engine 142 may sequence data 122 based on a hash, sorting, and/or index function. The hash, sorting, and/or indexing function is applied to a particular column of a table of data 122. The particular column may be associated with criteria 154. Sequence engine 142 sequences data 122 based on criteria 154. Criteria 154 may include an identification (e.g., a customer identification), a name (e.g., a customer name), a location (e.g., a city or state), an order number, (e.g., an invoice number), a date (e.g., Jan. 1, 2000), an Internet Protocol (IP) address, a department (e.g., a sales department), a price (e.g., a purchase price), and the like. Sequence engine 142 may sequence data 122 in any suitable order (e.g., alphabetical order or numerical order). For example, sequence engine 142 may sequence data 122 in alphabetical order based on criteria 154 representing the last names of customers. As another example, sequence engine 142 may sequence data 122 in ascending or descending numerical order based on criteria representing a price (e.g., $5, $10, $15, and the like).

Search engine 144 of staging area 130 is an application that searches data 122 stored in data warehouse 160. Search engine 144 may receive a request for data 122 stored in data warehouse 160 and an accompanying search criteria input from one or more search criteria sources 125. The search criteria input is associated with one or more criteria 154. For example, the search criteria input may be associated with a customer identification, a customer name, or a customer location. Search engine 144 determines which data storage unit 170 of data warehouse 160 to search based on the search criteria input. For example, the search criteria input may include a request to search data 122 based on a customer's last name. Search engine 144 may determine that data storage unit 172 is sequenced alphabetically based on the customer's last name. As a result of this determination, search engine 144 may search data storage unit 172 for the requested data 122. Search engine 144 may communicate a response to the search request based on the search. For example, search engine 144 may retrieve the requested data 122 from data storage unit 172 and communicate the requested data 122 to the one or more sources.

Re-creation engine 146 of staging area 130 is an application that re-creates data 122 stored in data warehouse 160. Re-creation engine 146 may determine that data 122 stored in a particular data storage unit 170 (e.g., data storage unit 172) of data warehouse 160 has been compromised (e.g., corrupted or otherwise inaccessible). Re-creation engine 146 may re-create the compromised data 122 using information stored in one or more other data storage units 170 (e.g., data storage unit 174 or data storage unit 176) of data warehouse 160. The information used to re-create the compromised data 122 may include a block identification of the block containing the compromised data 122 and the row identifications for the rows of data stored in the block containing the compromised data 122.

As an example, re-creation engine 146 may determine that first block 182 of data storage unit 172 is inaccessible. Search engine 146 may re-create first block 182 of data storage unit 172 using information associated with first block 182 of data storage unit 172 that is stored in pairing block 184 of data storage unit 174. Re-creation engine 146 may use block identification 153 for first block 182 and row identifications 152 of first block 182 of data storage unit 172 that are stored in pairing block 184 of data storage unit 174 to identify data 122 stored in inaccessible first block 182. Re-creation engine 146 may then search all blocks 184 of data storage unit 174 to locate the rows of data 122 associated with row identifications 152 of inaccessible first block 182. Re-creation engine 146 may then re-create inaccessible block 182 using the located rows of data 122 from the data storage unit 174.

Memory 134 stores database 150. Database 150 may be any one or a combination of volatile or non-volatile local or remote devices suitable for storing information. Database 150 may include RAM, ROM, magnetic storage devices, optical storage devices, or any other suitable information storage device or a combination of these devices. Database 150 may store certain types of information for staging area 130. For example, database 150 stores data 122, row identifications 152, block identifications 153, and criteria 154. Data 122 may be retrieved from one or more data sources 120 of system 100. Row identifications 152 and block identifications 153 may be generated by one or more components of staging area 130 (e.g., row identification engine 140). Criteria 154 may be received by staging area 130. Criteria 154 may be received from an administrator of system 100. In certain embodiments, criteria 154 may be generated by an automated process.

Processor 136 of staging area 130 controls certain operations of staging area 130 by processing information received from interface 132 and memory 134 or otherwise accessed by processor 136. Processor 136 communicatively couples to interface 132 and memory 134. Processor 136 may include any hardware and/or software that operates to control and process information. Processor 136 may be a programmable logic device, a microcontroller, a microprocessor, any suitable processing device, or any suitable combination of the preceding. Additionally, processor 136 may be a component external to staging area 130. Processor 136 may be located in any location suitable for processor 136 to communicate with staging area 130. Processor controls the operations of row identification engine 140, sequence engine 142, search engine 144, and re-creation engine 146.

Data warehouse 160 of system 100 is a system for storing data 122. Data warehouse 160 may include one or more components of the example computer system of FIG. 5. Data warehouse 160 may store data 122 from multiple data sources 120. Data warehouse 160 may receive data 122 from staging area 130. Data warehouse 160 includes data storage units 170 (e.g., data storage unit 172, data storage unit 174, and data storage unit 176). Each data storage unit 170 may be any one or a combination of volatile or non-volatile local or remote devices suitable for storing information. Each data storage unit 170 may include RAM, ROM, magnetic storage devices, optical storage devices, or any other suitable information storage device or a combination of these devices.

Each data storage unit 170 may store certain types of information for data warehouse 160. For example, data storage unit 172 may store data 122 in accordance with a first sequence associated with a first criteria (e.g., a customer identification), data storage unit 174 may store data 122 in accordance with a second sequence associated with a second criteria (e.g., a customer name), and data storage unit 176 may store data 122 stored in accordance with a third sequence associated with a third criteria (e.g., a city).

Each data storage unit 170 includes one or more blocks 180. Each block 180 has a maximum size for storage. Data storage unit 172 includes blocks 182, data storage unit 174 includes blocks 184, and data storage unit 176 includes blocks 186. Data 122 is stored in blocks 182, blocks 184, and blocks 186. The number of blocks 180 required to store data 122 is determined based on the size of data 122 and the size of each block 180.

Although FIG. 1 illustrates a particular arrangement of network 110, data sources 120, data 122, staging area 130, interface 132, memory 134, processor 136, row identification engine 140, sequence engine 142, search engine 144, re-creation engine 146, database 150, data warehouse 160, data storage units 170, and blocks 180, this disclosure contemplates any suitable arrangement of network 110, data sources 120, data 122, staging area 130, interface 132, memory 134, processor 136, row identification engine 140, sequence engine 142, search engine 144, re-creation engine 146, database 150, data warehouse 160, data storage units 170, and blocks 180, One or more of data sources 120, data 122, staging area 130, interface 132, memory 134, processor 136, row identification engine 140, sequence engine 142, search engine 144, re-creation engine 146, database 150, data warehouse 160, data storage units 170, and blocks 180 may be connected to each other directly, bypassing network 110. Data sources 120, data 122, staging area 130, interface 132, memory 134, processor 136, row identification engine 140, sequence engine 142, search engine 144, and re-creation engine 146, database 150, data warehouse 160, data storage units 170, and blocks 180, may be physically or logically co-located with each other in whole or in part.

Although FIG. 1 illustrates a particular number of networks 110, data sources 120, data 122, staging areas 130, interfaces 132, memories 134, processors 136, row identification engines 140, sequence engines 142, search engines 144, re-creation engines 146, databases 150, data warehouses 160, data storage units 170, and blocks 180, this disclosure contemplates any suitable number of networks 110, data sources 120, data 122, staging areas 130, interfaces 132, memories 134, processors 136, row identification engines 140, sequence engines 142, search engines 144, re-creation engines 146, databases 150, data warehouses 160, data storage units 170, and blocks 180. For example, data warehouse 160 may include more or less than three data storage units 170.

In operation, staging area 130 receives data 122 from data source 120. Row identification engine 140 batches data 122 into a batch, calculates a number of blocks 180 required to load the batch into data warehouse 160, and determines a row identification 152 for each row of data 122 in the batch. Sequence engine 142 sequences the rows of data 122 into a first sequence based on a first criteria (e.g., a customer identification) and a second sequence based on a second criteria (e.g., a customer name). Sequence engine 142 determines to store the rows of data 122 in data storage unit 172 in accordance with the first sequence such that a first block 182 of data storage unit 172 comprises a first set of the rows of data 122. Sequence engine 142 determines to store the rows of data 122 in data storage unit 174 in accordance with the second sequence such that a first block 184 of data storage unit 174 comprises a second set of the rows of data 122.

Search engine 144 determines to store block identification 153 of first block 182 of first storage unit 172 and row identifications 152 for each row of the first set of rows in first block 184 of second storage unit 174. Search engine 144 determines to store block identification 153 of first block 184 of second storage unit 174 and row identifications 152 for each row of the second set of the plurality of rows in first block 182 of first storage unit 172.

Search engine 144 receives a request for data stored in data warehouse 160 and a search criteria input from an administrator. Data 122 is stored in first data storage unit 172 and second data storage unit 174. The search criteria input is associated with first criteria 154. Search engine 144 determines to search first data storage unit 172 based on the search criteria input. Search engine 144 determines that data 122 stored in first block 182 of first data storage unit 172 is inaccessible. Re-creation engine 146 re-creates the first set of rows of first block 182 of first storage unit 172 using information stored in first block 184 (i.e., the pairing block to first block 182 of first storage unit 172) of second storage unit 174. Search engine 144 searches first data storage unit 172 for the requested data and communicates a response to the administrator.

As such, system 100 of FIG. 1 defines replication of data 122 by storing data 122 in different data storage units 170 according to different sequences based on different criteria 154, which maintains the benefits of replicating data 122 to ensure data integrity and consistency while eliminating the need to reshuffle data 122.

FIG. 2A illustrates an example data warehouse 200 that may be used by a prior art system. Data warehouse 200 stores data on a block-by-block basis. Data warehouse 200 of FIG. 2 includes data storage unit 210, data storage unit 220, and data storage unit 230. Data storage unit 210, data storage unit 220, and data storage unit 230 each include blocks B1, B2, and B3. Data storage unit 210 of data warehouse 200 stores 300 rows of data. Each block (i.e., B1, B2, and B3) of data storage unit 210 stores 100 rows of data. The data is stored based on an identification (e.g., a customer identification) of each row. Block B1 of data storage unit 210 stores 100 rows with identifications 1 through 100, block B2 of data storage unit 210 stores 100 rows with identifications 101 through 200, and block B3 of data storage unit 210 stores 100 rows with identifications 201 through 300.

The data stored in data storage unit 210 is replicated in data storage unit 220 and data storage unit 230. The 100 rows with identifications 1 through 100 stored in block B1 of data storage unit 210 are replicated in block B3 of data storage unit 220 (see notation 250) and in block B2 of data storage unit 230 (see notation 252). The 100 rows with identifications 101 through 200 stored in block B2 of data storage unit 210 are replicated in block B1 of data storage unit 220 (see notation 260) and in block B3 of data storage unit 230 (see notation 262). The 100 rows with identifications 201 through 300 stored in block B3 of data storage unit 210 are replicated in block B2 of data storage unit 220 (see notation 270) and in block B1 of data storage unit 230 (see notation 272). As such, block B1 of data storage unit 210, block B3 of data storage unit 220, and block B2 of data storage unit 230 are exact replicas of each other; block B2 of data storage unit 210, block B1 of data storage unit 220, and block B3 of data storage unit 230 are exact replicas of each other; and block B3 of data storage unit 210, block B2 of data storage unit 220, and block B1 of data storage unit 230 are exact replicas of each other.

FIG. 2B illustrates example block data that may be stored by data warehouse 200 of FIG. 2A. Block B1 of data storage unit 210 stores table 280. Table 280 of block B1 of data storage unit 210 includes 100 rows of data and five columns: customer identification (e.g., 1, 2, 3, and so on until 100), customer name (e.g., B, D, A, and so on until C), customer city (e.g., City 1, City 2, City 2, and so on until City 3), account (e.g., checking 1, savings 2, credit 3, and so on until credit 5), and transaction amount (e.g., $10, $20, $15, and so on until $25). In the illustrated example, the data is hashed in accordance with the customer identification column to generate the sequence of customer identifications 1 through 100. The data of table 280 is replicated to block B3 of data storage unit 220, as shown in table 282, and block B2 of data storage unit 230, as shown in table 284.

As illustrated in FIGS. 2A and 2B, data warehouse 200 stores data on a block-by-block basis such that the replicated blocks (i.e., block B1 of data storage unit 210, block B3 of data storage unit 220, and B3 of data storage unit 230) are exact replicas of each other. All copies run on the same hash function for the same column (e.g., the customer identification column). For all other columns (e.g., the customer name, customer city, account, and transaction amount columns) that are not part of the hash function, the data must be loaded into a memory and rehashed before access and join.

FIG. 3A shows an example data warehouse 160 that may be used by system 100 of FIG. 1. Data warehouse 160 stores data (e.g., data 122 of FIG. 1) on a batch-load basis rather than a block-by-block basis. Data storage unit 160 includes data storage units 170 (e.g., data storage unit 172, data storage unit 174, and data storage unit 176) and blocks 180 (e.g., blocks 182, blocks 184, and blocks 186). Blocks 182 of data storage unit 172 include blocks B1, B2, and B3. Blocks 184 of data storage unit 174 include blocks B1, B2, and B3. Blocks 186 of data storage unit 176 include blocks B1, B2, and B3. Each data storage unit 172, 174, and 176 of data warehouse 160 stores 300 rows of data. Each row is assigned a row identification (e.g., row identification 152 of FIG. 1). Each block 180 (e.g., B1, B2, and B3) of each data storage unit 170 stores 100 rows of data. Each block 180 is assigned a block identification (e.g., block identification 153 of FIG. 1).

The data is stored in data storage unit 172 in accordance with a first sequence. The sequence is generated based on a first criteria (e.g., a customer identification). For example, the data may be sequenced in numerical, ascending order based on a customer identification number and stored in numerical, ascending order in blocks 182 of data storage unit 172. In the illustrated embodiment, block B1 of data storage unit 172 stores 100 rows with customer identifications 1 through 100, block B2 of data storage unit 172 stores 100 rows with customer identifications 201 through 300, and block B3 of data storage unit 172 stores 100 rows with customer identifications 301 through 400.

The data is stored in data storage unit 174 in accordance with a second sequence. The sequence is generated based on a second criteria (e.g., a customer name). For example, the data may be sequenced in alphabetical order based on a customer name (e.g., a customer last name) and stored in alphabetical order in blocks 184 of data storage unit 174. In the illustrated embodiment, block B1 of data storage unit 174 stores 100 rows with customer names "a" through "h", block B2 of data storage unit 174 stores 100 rows with customer names "i" through "o", and block B3 of data storage unit 174 stores 100 rows with customer names "p" through "z".

The data is stored in data storage unit 176 in accordance with a third sequence. The sequence is generated based on a third criteria (e.g., a customer city). For example, the data may be sequenced in alphabetical order based on a customer city and stored in alphabetical order in blocks 186 of data storage unit 176. In the illustrated embodiment, block B1 of data storage unit 174 stores 100 rows with customer cities "a" through "h", block B2 of data storage unit 174 stores 100 rows with customer cities "i" through "o", and block B3 of data storage unit 174 stores 100 rows with customer cities "p" through "z".

Blocks 180 of data storage units 170 form pairing blocks. In the illustrated embodiment, blocks B1 of data storage units 172, 174, and 176 are pairing blocks, blocks B2 of data storage units 172, 174, and 176 are pairing blocks, and blocks B3 of data storage units 172, 174, and 176 are pairing blocks. Each block of the pairing blocks stores information that may be used to re-create a compromised pairing block. For example, the information stored in block B1 of data storage unit 174 or block B1 of data storage unit 176 may be used to re-create a compromised block B1 of data storage unit 172.

The information stored in the pairing blocks that is used to re-create a compromised pairing block includes a block identification (e.g., block identification 153 of FIG. 1) for each block of the pairing blocks. The block identification is used to identify the other pairing blocks. The block identifications for blocks B1, B2, and B3 of data storage unit 172 are D1B1, D1B2, and D1B3, respectively. Block identifications D1B1, D1B2, and D1B3 are stored in the respective pairing blocks 180 of data storage units 174 and 176. As illustrated, block identification D1B1 is stored in pairing blocks B1 of data storage units 174 and 176, block identification D1B2 is stored in pairing blocks B2 of data storage units 174 and 176, and block identification D1B3 is stored in pairing blocks B3 of data storage units 174 and 176.

The block identifications for blocks B1, B2, and B3 of data storage unit 174 are D2B1, D2B2, and D2B3, respectively. Block identifications D2B1, D2B2, and D2B3 are stored in the respective pairing blocks 180 of data storage units 172 and 176. As illustrated, block identification D2B1 is stored in pairing blocks B1 of data storage units 172 and 176, block identification D2B2 is stored in pairing blocks B2 of data storage units 172 and 176, and block identification D2B3 is stored in pairing blocks B3 of data storage units 172 and 176.

The block identifications for blocks B1, B2, and B3 of data storage unit 176 are D3B1, D3B2, and D3B3, respectively. Block identifications D3B1, D3B2, and D3B3 are stored in the respective pairing blocks 180 of data storage units 172 and 174. As illustrated, block identification D3B1 is stored in pairing blocks B1 of data storage units 172 and 174, block identification D3B2 is stored in pairing blocks B2 of data storage units 172 and 174, and block identification D3B3 is stored in pairing blocks B3 of data storage units 172 and 174.

The information stored in the pairing blocks that is used to re-create a compromised pairing block includes a row identification (e.g., row identifications 152 of FIG. 1) for each row of data stored in each block of the pairing blocks. The row identifications are used to identify and re-create the rows of data in the other pairing blocks. The row identifications for data stored in block B1 of data storage unit 172 are stored in blocks B1 of data storage units 174 and 176; the row identifications for data stored in block B1 of data storage unit 174 are stored in blocks B1 of data storage units 172 and 176; and the row identifications for data stored in block B1 of data storage unit 176 are stored in blocks B1 of data storage units 172 and 174. Similarly, the row identifications for data stored in block B2 of data storage unit 172 are stored in blocks B2 of data storage units 174 and 176; the row identifications for data stored in block B2 of data storage unit 174 are stored in blocks B2 of data storage units 172 and 176; and the row identifications for data stored in block B2 of data storage unit 176 are stored in blocks B1 of data storage units 172 and 174. Similarly, the row identifications for data stored in block B3 of data storage unit 172 are stored in blocks B3 of data storage units 174 and 176; the row identifications for data stored in block B3 of data storage unit 174 are stored in blocks B3 of data storage units 172 and 176; and the row identifications for data stored in block B3 of data storage unit 176 are stored in blocks B3 of data storage units 172 and 174.

FIG. 3B shows example block data that may be generated by data warehouse 160 of FIG. 3A. Block B1 of data storage unit 172 stores table 312. Table 312 of block B1 of data storage unit 172 includes 100 rows of data and six columns: row identification (e.g., 1, 2, 3, and so on until 100), customer identification (e.g., 1, 2, 3, and so on until 100), customer name (e.g., B, D, A, and so on until C), customer city (e.g., City 1, City 2, City 2, and so on until City 3), account (e.g., checking 1, savings 2, credit 3, and so on until credit 5), and transaction amount (e.g., $10, $20, $15, and so on until $25). The data of table 312 is sorted (e.g., hashed) based on the customer identification column. As shown, the data of table 312 is sequenced in numerical order (e.g., 1, 2, 3, and so on until 100) according to customer identification.

Block B1 of data storage unit 174 stores table 314. Table 314 of block B1 of data storage unit 174 is similar to table 312 of data storage unit 172 in that table 314 includes 100 rows of data and six columns: row identification, customer identification, customer name, customer city, account, and transaction amount. However, the data of table 314 is sorted (e.g., hashed) based on the customer name column rather than the customer identification column. As shown, the data of table 314 is sequenced in alphabetical order (e.g., A, B, C, and so on) according to customer name.

Block B1 of data storage unit 176 stores table 316. Table 316 of block B1 of data storage unit 174 is similar to table 312 of data storage unit 172 and table 314 of data storage unit 164 in that table 316 includes 100 rows of data and six columns: row identification, customer identification, customer name, customer city, account, and transaction amount. However, the data of table 316 is sorted (e.g., hashed) based on the customer city column rather than customer identification or customer name columns. As shown, the data of table 316 is sequenced in numerical order (e.g., City 1, City 2, City 3, and so on) according to customer city.

Pairing blocks B2 and pairing blocks B3 of data storage units 172, 174, and 176 store data in a similar fashion to blocks B1 of data storage units 172, 174, and 176. As such, data (e.g., data 122 of FIG. 1) is replicated across blocks 182 of data storage unit 172, blocks 184 of data storage unit 174, and blocks 186 of data storage unit 176 in different sequences of rows according to different sequencing (e.g., hashing) functions. By storing the data in different data storage units 170 according to different sequences based on different criteria (e.g., customer identification, customer name, and customer city), the benefits of replicating the data (e.g., to ensure data integrity and consistency) are preserved while eliminating the need to rehash the data.

Although FIGS. 3A and 3B illustrate a particular arrangement of data warehouse 160, data storage units 170, blocks 180, and tables 300, this disclosure contemplates any suitable arrangement of data warehouse 160, data storage units 170, blocks 180, and tables 300. Although FIGS. 3A and 3B illustrate a particular number of data warehouses 160, data storage units 170, blocks 180, and tables 300, this disclosure contemplates any suitable number of data warehouses 160, data storage units 170, blocks 180, and tables 300. For example, data storage units 170 may be included in different data warehouses 160. As another example, each data storage unit 170 may include more or less than three blocks 180. As still another example, each table 300 may include more or less than 100 rows and/or six columns.

FIG. 4 shows an example method for defining replication of data that may be used by system 100 of FIG. 1. Method 400 begins at step 405. At step 410, a row identification engine (e.g., row identification engine 140 of FIG. 1) determines a row identification (e.g., row identifications 152 of FIG. 1) for each of a plurality of rows of data (e.g., data 122 of FIG. 1). For example, a staging area (e.g., staging area 130 of FIG. 1) may receive data (e.g., data 122 of FIG. 1) from one or more data sources (e.g., data source 120 of FIG. 1) and batch the data, and the row identification engine may assign a virtual unique row identification to each row of data inside the batch. In certain embodiments, row identification engine may determine a number of blocks required to store the data in a data warehouse (e.g., data warehouse 160 of FIG. 1) and assign a block identification (e.g., block identifications 153 of FIG. 1) to each of the blocks of the data warehouse.

At step 415, a sequence engine (e.g., sequence engine 142 of FIG. 1) may sequence the plurality of rows into a first sequence based on a first criteria (e.g., criteria 154 of FIG. 1). For example, the sequence engine may sequence the plurality of rows into a numerical sequence based on a customer identification number. At step 420, the sequence engine may sequence the plurality of rows into a second sequence based on a second criteria. For example, the sequence engine may sequence the plurality of rows into an alphabetical sequence based on a customer name.

At step 425, the sequence engine may store a first set of the plurality of rows in a first block of a first storage unit (e.g., block B1 of data storage unit 172 of FIG. 3A) in accordance with the first sequence. For example, the sequence engine may store the rows of data having customer numbers 1-100 in the first block of the first storage unit. The rows of data having other customer numbers (e.g., customer numbers 201 through 300 and 301 through 400) may be stored in other blocks of the first storage unit (e.g., blocks B2 and B3 of data storage unit 172 of FIG. 3A)

At step 430, the sequence engine may store a second set of the plurality of rows in a first block of a second storage unit (e.g., block B1 of data storage unit 174 of FIG. 3A) in accordance with the second sequence. For example, the sequence engine may store the rows of data having customer names beginning with "a" through "h" in the first block of the first storage unit. The rows of data having other customer names (e.g., customer names "i" through "o" and "p" through "z") may be stored in other blocks of the second storage unit (e.g., blocks B2 and B3 of data storage unit 174 of FIG. 3A).

At step 435, a search engine (e.g., search engine 144 of FIG. 1) may store, in the first block of the second storage unit, a block identification (e.g., block identifications 153 of FIG. 1) of the first block of the first storage unit and the row identification (e.g., row identifications 152 of FIG. 1) for each row of the first set of the plurality of rows. For example, as shown in FIG. 3A, the search engine may store block identification D1B1 of block B1 of data storage unit 172 and the row identifications for the rows of data stored in block B1 of data storage unit 172 in block B1 of data storage unit 174.

At step 440, the search engine may store, in the first block of the first storage unit, a block identification (e.g., block identifications 153 of FIG. 1) of the first block of the second storage unit and the row identification (e.g., row identifications 152 of FIG. 1) for each row of the second set of the plurality of rows. For example, as shown in FIG. 3A, the search engine may store block identification D2B1 of block B1 of data storage unit 174 and the row identifications for the rows of data stored in block B1 of data storage unit 174 in block B1 of data storage unit 172.

At step 445, the search engine may receive a search criteria input and a data request for data stored in the first and second data storage units. The search criteria input may be received from a search criteria source (e.g., search criteria source 125 of FIG. 1). For example, the search criteria input may be received from a user (e.g., an administrator) via a user device that may communicate with the staging area via a network (e.g., network 110 of FIG. 1). In certain embodiments, the search criteria input may be received from an automated process. The search criteria input may be associated with either the first criteria (e.g., a customer identification) or the second criteria (e.g., a customer name). At step 450, the search engine selects either the first data storage unit or the second data storage unit based on the search criteria input. If the search criteria input is associated with the first criteria, the search engine selects the first data storage unit to search for the data request. If the search criteria input is associated with the second criteria, the search engine selects the second storage unit to search for the data request.

At step 455, a re-creation engine (e.g., re-creation engine 146 of FIG. 1) may determine whether the first block of the selected data storage unit is inaccessible (e.g., corrupt). If the re-creation engine determines that the first block of the selected storage unit is accessible, method 400 advances from step 455 to step 465, where the search engine retrieves the requested data from a block (e.g., the first block) of the selected storage unit.

If the re-creation engine determines that the first block of the selected storage unit is inaccessible, method 400 advances from step 455 to step 460, where the search engine re-creates the first block of the selected data storage unit using information associated with the first block of the selected data storage unit that is stored in the unselected data storage unit. For example, the re-creation engine may use the block identification and the row identifications of the inaccessible block of the selected data storage unit that are stored in an accessible block (i.e., a pairing block of the inaccessible block) of the unselected data storage unit to identify the data stored in the inaccessible block. The re-creation engine may then search all blocks of the unselected data storage unit to locate the rows of data associated with the row identifications of the inaccessible block. The re-creation engine may then re-create the inaccessible block using the located rows of data from the unselected data storage unit. For example, the re-creation engine may re-create the inaccessible block (e.g., block B1 of data storage unit 172 of FIG. 3A) by combining the located rows of data from the unselected data storage unit (e.g., blocks B1, B2, and B3 of data storage unit 174 of FIG. 3A) and sorting (e.g., hashing) the located rows according to the first criteria.

Method 400 then advances to step 465, where the where the search engine retrieves the requested data from a block (e.g., the re-created first block) of the selected storage unit. The search engine may then communicate the requested data to an administrator in response to the search criteria input received in step 445. Method 400 ends at step 470.

Modifications, additions, or omissions may be made to method 400 depicted in FIG. 4. Method 400 may include more, fewer, or other steps. For example, method 400 may include sequencing the plurality of rows into a third sequence based on a third criteria. As another example, method 300 may include determining a number of blocks required to store the data in the first data storage unit. Steps may be performed in parallel or in any suitable order. While discussed as specific components completing the steps of method 400, any suitable component of system 100 may perform any step of method 400.

FIG. 5 shows an example computer system that may be used by the systems and methods described herein. For example, data source 120, staging area 130, and/or data warhouse 160 of FIG. 1 may include one or more interface(s) 510, processing circuitry 520, memory(ies) 530, and/or other suitable element(s). Interface 510 (e.g., interface 132 of FIG. 1) receives input, sends output, processes the input and/or output, and/or performs other suitable operation. Interface 510 may comprise hardware and/or software.

Processing circuitry 520 (e.g., processor 136 of FIG. 1) performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 (e.g., memory 134 of FIG. 1) may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising one or more processors and a memory storing instructions that, when executed by the one or more processors, cause the one or more processors to perform operations comprising:
   determining a row identification for each of a plurality of rows of data;
   sequencing the plurality of rows into:
      a first sequence based on a first criteria; and
      a second sequence based on a second criteria;
   determining to store a first set of the plurality of rows in a first block of a first storage unit in accordance with the first sequence;
   determining to store a second set of the plurality of rows in a first block of a second storage unit in accordance with the second sequence;
   determining to store, in the first block of the second storage unit, a block identification of the first block of the first storage unit and the row identification for each row of the first set of the plurality of rows;
   determining to store, in the first block of the first storage unit, a block identification of the first block of the second storage unit and the row identification for each row of the second set of the plurality of rows;
   receiving a search criteria input for data stored in the first data storage unit and the second data storage unit, wherein the search criteria input is associated with the first criteria;
   determining to search the first data storage unit based on the search criteria input;

determining that data stored in the first block of the first data storage unit is inaccessible;
re-creating the first set of the plurality of rows of the first block of the first storage unit using information stored in the second storage unit; and
communicating a response to the search criteria input.

2. The system of claim 1, wherein the response to the search criteria input comprises data obtained from the first set of the plurality of rows of the first block of the first storage unit.

3. The system of claim 1, wherein:
the information stored in the second storage unit comprises:
the block identification of the first block of the first storage unit stored in the first block of the second storage unit; and
the row identifications for the first set of the plurality of rows stored in the first block of the second storage unit; and
the re-created first set of the plurality of rows of the first block of the first storage unit are obtained from two or more blocks of the second data storage unit.

4. The system of claim 1, wherein the first criteria and the second criteria each comprises one of the following:
a customer identification number;
a customer name; and
a customer city.

5. The system of claim 1, further comprising:
sequencing the plurality of rows into a third sequence based on the first criteria;
determining to store a third set of the plurality of rows in a first block of a third storage unit in accordance with the third sequence;
determining to store, in the first block of the third storage unit, the block identification of the first block of the first storage unit and the row identification for each row of the first set of the plurality of rows; and
determining to store, in the first block of the third storage unit, the block identification of the first block of the second storage unit and the row identification for each row of the second set of the plurality of rows.

6. The system of claim 1, further comprising:
storing the data in a data staging area; and
calculating a number of blocks of the first data storage unit required to store the data, wherein the plurality of rows of the data is stored in the calculated number of blocks in accordance with the first sequence.

7. The system of claim 1, wherein sequencing the plurality of rows into a first sequence is further based on one of the following:
an alphabetical order; and
a numerical order.

8. A method performed by one or more processors, comprising:
determining a row identification for each of a plurality of rows of data;
sequencing the plurality of rows into:
a first sequence based on a first criteria; and
a second sequence based on a second criteria;
determining to store a first set of the plurality of rows in a first block of a first storage unit in accordance with the first sequence;
determining to store a second set of the plurality of rows in a first block of a second storage unit in accordance with the second sequence;
determining to store, in the first block of the second storage unit, a block identification of the first block of the first storage unit and the row identification for each row of the first set of the plurality of rows;
determining to store, in the first block of the first storage unit, a block identification of the first block of the second storage unit and the row identification for each row of the second set of the plurality of rows;
receiving a search criteria input for data stored in the first data storage unit and the second data storage unit, wherein the search criteria input is associated with the first criteria;
determining to search the first data storage unit based on the search criteria input;
determining that data stored in the first block of the first data storage unit is inaccessible;
re-creating the first set of the plurality of rows of the first block of the first storage unit using information stored in the second storage unit; and
communicating a response to the search criteria input.

9. The method of claim 8, wherein the response to the search criteria input comprises data obtained from the first set of the plurality of rows of the first block of the first storage unit.

10. The method of claim 8, wherein:
the information stored in the second storage unit comprises:
the block identification of the first block of the first storage unit stored in the first block of the second storage unit; and
the row identifications for the first set of the plurality of rows stored in the first block of the second storage unit; and
the re-created first set of the plurality of rows of the first block of the first storage unit are obtained from two or more blocks of the second data storage unit.

11. The method of claim 8, wherein the first criteria and the second criteria each comprises one of the following:
a customer identification number;
a customer name; and
a customer city.

12. The method of claim 8, further comprising:
sequencing the plurality of rows into a third sequence based on the first criteria;
determining to store a third set of the plurality of rows in a first block of a third storage unit in accordance with the third sequence;
determining to store, in the first block of the third storage unit, the block identification of the first block of the first storage unit and the row identification for each row of the first set of the plurality of rows; and
determining to store, in the first block of the third storage unit, the block identification of the first block of the second storage unit and the row identification for each row of the second set of the plurality of rows.

13. The method of claim 8, further comprising:
storing the data in a data staging area; and
calculating a number of blocks of the first data storage unit required to store the data, wherein the plurality of rows of the data is stored in the calculated number of blocks in accordance with the first sequence.

14. The method of claim 8, wherein sequencing the plurality of rows into a first sequence is further based on one of the following:
an alphabetical order; and
a numerical order.

15. One or more non-transitory computer-readable storage media embodying instructions that, when executed by one or more processors, cause the one or more processors to perform operations, comprising:
- determining a row identification for each of a plurality of rows of data;
- sequencing the plurality of rows into:
  - a first sequence based on a first criteria; and
  - a second sequence based on a second criteria;
- determining to store a first set of the plurality of rows in a first block of a first storage unit in accordance with the first sequence;
- determining to store a second set of the plurality of rows in a first block of a second storage unit in accordance with the second sequence;
- determining to store, in the first block of the second storage unit, a block identification of the first block of the first storage unit and the row identification for each row of the first set of the plurality of rows;
- determining to store, in the first block of the first storage unit, a block identification of the first block of the second storage unit and the row identification for each row of the second set of the plurality of rows;
- receiving a search criteria input for data stored in the first data storage unit and the second data storage unit, wherein the search criteria input is associated with the first criteria;
- determining to search the first data storage unit based on the search criteria input;
- determining that data stored in the first block of the first data storage unit is inaccessible;
- re-creating the first set of the plurality of rows of the first block of the first storage unit using information stored in the second storage unit; and
- communicating a response to the search criteria input.

16. The one or more non-transitory computer-readable storage media of claim 15, wherein the response to the search criteria input comprises data obtained from the first set of the plurality of rows of the first block of the first storage unit.

17. The one or more non-transitory computer-readable storage media of claim 15, wherein:
- the information stored in the second storage unit comprises:
  - the block identification of the first block of the first storage unit stored in the first block of the second storage unit; and
  - the row identifications for the first set of the plurality of rows stored in the first block of the second storage unit; and
- the re-created first set of the plurality of rows of the first block of the first storage unit are obtained from two or more blocks of the second data storage unit.

18. The one or more non-transitory computer-readable storage media of claim 15, wherein the first criteria and the second criteria each comprises one of the following:
- a customer identification number;
- a customer name; and
- a customer city.

19. The one or more non-transitory computer-readable storage media of claim 15, embodying instructions that, when executed by the one or more processors, cause the one or more processors to perform further operations comprising:
- sequencing the plurality of rows into a third sequence based on the first criteria;
- determining to store a third set of the plurality of rows in a first block of a third storage unit in accordance with the third sequence;
- determining to store, in the first block of the third storage unit, the block identification of the first block of the first storage unit and the row identification for each row of the first set of the plurality of rows; and
- determining to store, in the first block of the third storage unit, the block identification of the first block of the second storage unit and the row identification for each row of the second set of the plurality of rows.

20. The one or more non-transitory computer-readable storage media of claim 15, embodying instructions that, when executed by the one or more processors, cause the one or more processors to perform further operations comprising:
- storing the data in a data staging area; and
- calculating a number of blocks of the first data storage unit required to store the data, wherein the plurality of rows of the data is stored in the calculated number of blocks in accordance with the first sequence.

* * * * *